United States Patent [19]

Turner

[11] Patent Number: 4,734,907
[45] Date of Patent: Mar. 29, 1988

[54] BROADCAST PACKET SWITCHING NETWORK

[75] Inventor: Jonathan S. Turner, University City, Mo.

[73] Assignee: Washington University, St. Louis, Mo.

[21] Appl. No.: 773,380

[22] Filed: Sep. 6, 1985

[51] Int. Cl.$^4$ .............................................. H04J 3/26
[52] U.S. Cl. ........................................ 370/60; 370/94
[58] Field of Search .......................... 370/94, 60, 89; 340/825.5

[56] References Cited

U.S. PATENT DOCUMENTS

| | | | |
|---|---|---|---|
| 4,321,703 | 3/1982 | Schwaertzel et al. ................ | 370/89 |
| 4,399,531 | 8/1983 | Grande et al. ......................... | 370/60 |
| 4,484,326 | 11/1984 | Turner ................................... | 370/60 |
| 4,486,877 | 12/1984 | Turner ................................... | 370/15 |
| 4,488,288 | 12/1984 | Turner ................................... | 370/60 |
| 4,488,289 | 12/1984 | Turner ................................... | 370/60 |
| 4,490,817 | 12/1984 | Turner ................................... | 370/17 |
| 4,491,945 | 1/1985 | Turner ................................... | 370/60 |
| 4,494,230 | 1/1985 | Turner ................................... | 370/60 |
| 4,516,238 | 5/1985 | Huang et al. .......................... | 370/60 |
| 4,566,095 | 1/1986 | De Vault et al. ...................... | 370/94 |

OTHER PUBLICATIONS

"Starlite: A Wideband Digital Switch," Globecom 84, pp. 121-125, Huang et al.
Jenq, "Performance Analysis of a Packet Switch Based on Single-Buffered Banyan Network", *IEEE Journal on Selected Areas in Communications*, vol. SAC-1, Dec. 1983, pp. 1014-1021.
Feng, "A Survey of Interconnection Networks", *Computer*, vol. 14, No. 12, Dec. 1983, pp. 12-27.

*Primary Examiner*—Douglas W. Olms
*Attorney, Agent, or Firm*—James W. Falk

[57] ABSTRACT

A high performance packet switching network that can be used to provide voice data and video communication on a large scale is disclosed. The packet switching network has a broadcast capability which makes it suitable for applications including commercial television distribution and conferencing.

The basic switching capability of the network is provided by a switching module which is capable of producing a desired number of copies of a broadcast packet and routing the copied packets to desired destinations. A plurality of switching modules may be interconnected to form a packet switch. Interconnection circuitry is provided so that the number of interconnected switch modules may be varied with a minimum of recabling.

19 Claims, 24 Drawing Figures

DATA TRANSFER PACKET

SWITCH PACKET

FIG. 7

BROADCAST PACKET SWITCH

| TIME | EVENT |
|---|---|
| 0 | PACKETS ENTER COPYNETWORK (CN) |
| 96 | PACKETS ENTER BGT |
| 160 | PACKETS ENTER DISTRIBUTION NETWORK (DN) |
| 256 | PACKETS ENTER ROUTING NETWORK (RN) |
| 352 | PACKETS ENTER DESTINATION PACKET PROCESSORS (PP) |
| 400 | GRANTS READY AT LAST STAGE OF RN |
| 448 | GRANTS READY AT LAST STAGE OF DN |
| 496 | GRANTS READY AT EXIT OF BGT |
| 500 | GRANTS READY AT LAST STAGE OF CN |
| 548 | GRANTS READY AT PP |
| 605 | LAST BYTE OF PACKET ENTERS CN |
| 701 | LAST BYTE OF PACKET ENTERS BGT |
| 765 | LAST BYTE OF PACKET ENTERS DN |
| 861 | LAST BYTE OF PACKET ENTERS RN |
| 957 | LAST BYTE OF PACKET ENTERS PP |
| 608 | NEW PACKET CYCLE STARTS AT INPUT TO CN |

FIG. 8

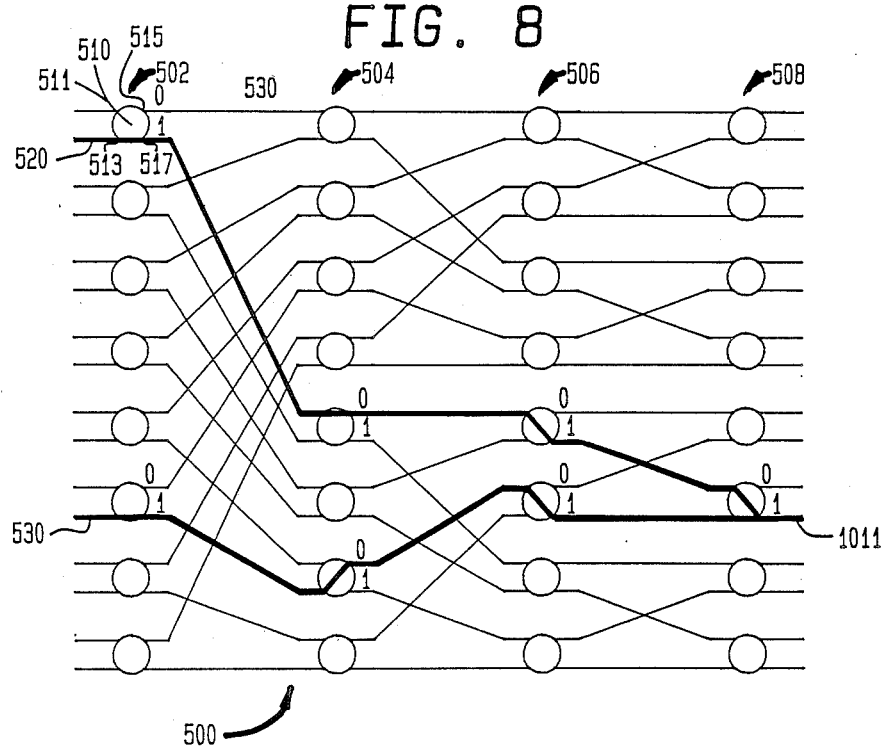

| | RF | | CONTROL | | | | | | | |
|---|---|---|---|---|---|---|---|---|---|---|
| B | NC | BCN | BGT UPDATE | NC' | (RF$_0$) | (RF$_1$) | (RF$_2$) | ----- | (RF$_H$) | ----- (RF$_{NC-1}$) |

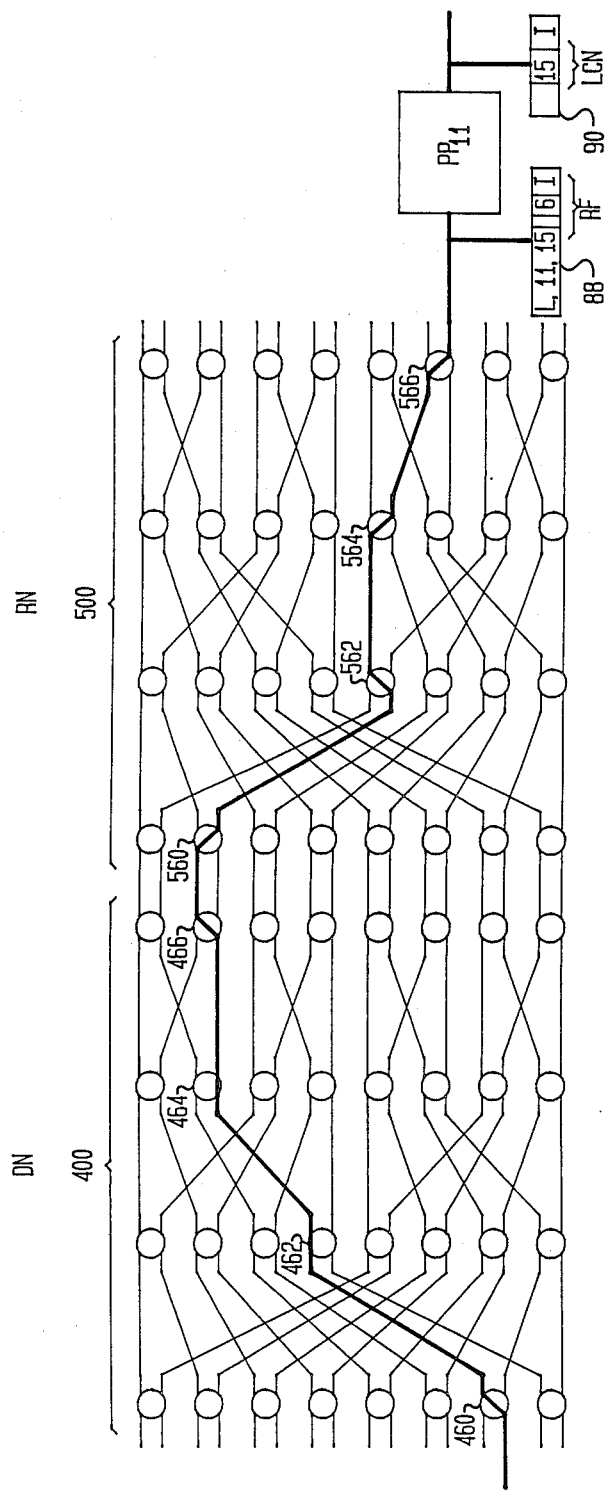

0 : Z- TO Z+
1 : X- TO Z+
3 : X- TO X+
4 : Z- TO X+

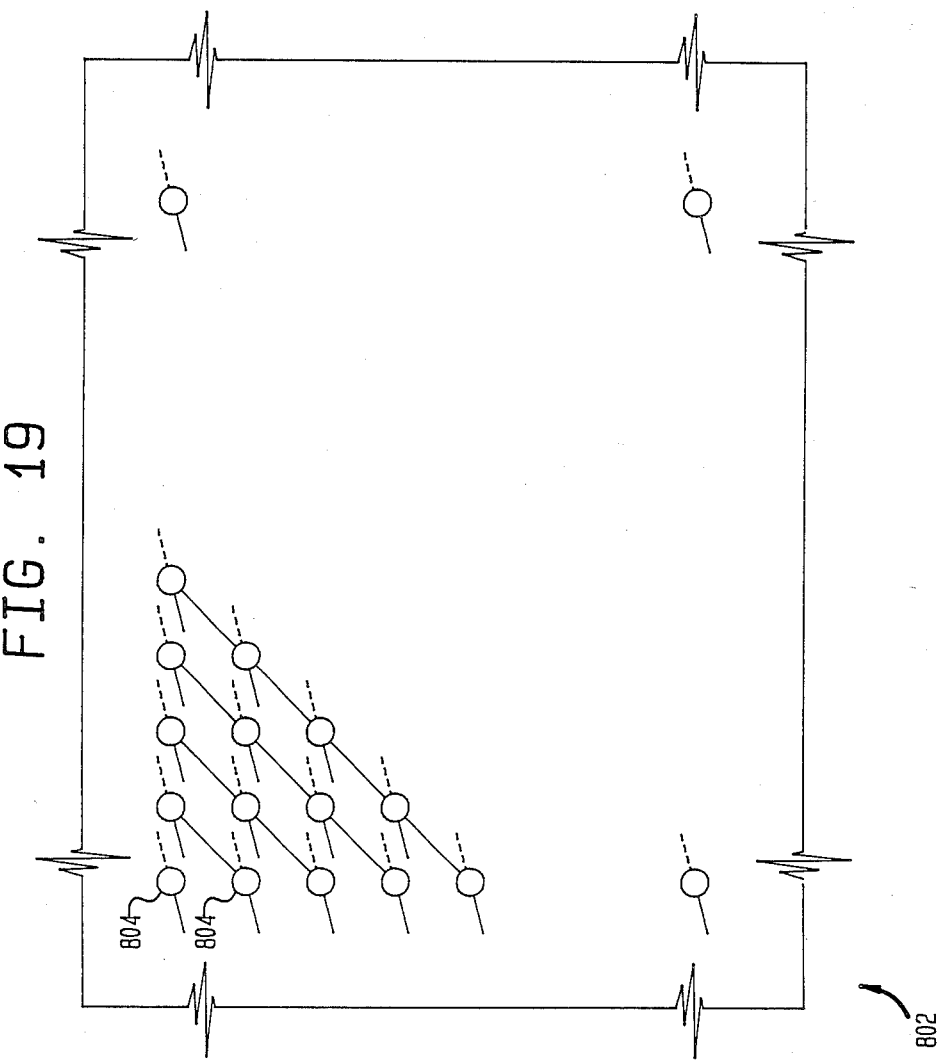

TWO BSM CONFIGURATION

BROADCAST PACKET SWITCHING NETWORK

FIELD OF THE INVENTION

The present invention relates to a high performance packet switching network having a broadcast capability.

BACKGROUND OF THE INVENTION

The advantage of transmitting data and voice information in packet form has long been recognized. Packet switching has proven especially useful where information to be transmitted occurs in short bursts such as in real time interactive data transmissions.

A packet switching network generally comprises an array of packet switches, which switches are generally connected by one or more high bit rate data links. Virtual circuits passing through a plurality of packet switches are set up in the network to provide point-to-point connections between pairs of user stations that wish to exchange information. An example of a packet switching network is disclosed in Turner "A Fast Packet Switching Network", U.S. Pat. No. 4,494,230. While prior art packet switching networks such as that disclosed in U.S. Pat. No. 4,494,230 are generally suitable for providing point-to-point connections between pairs of user stations, such prior art packet switching networks are not capable of operating efficiently in the broadcast mode. Thus, they cannot provide a variety of commercial services including television distribution and conferencing.

Accordingly, it is the object of the present invention to provide a packet switching network capable of efficient operation in the broadcast mode as well as capable of providing point-to-point connections between individual users.

SUMMARY OF THE INVENTION

The present invention is a high performance packet switching network having point-to-point as well as broadcast capability. This enables a wide range of commercial services including television distribution and conferencing. The basic switching capability of the inventive network is provided by a packet switching module. The switching modules of the present invention are designed to be modular so that they can be interconnected to form packet switches which, in turn, may be interconnected to form the packet switching network. A means for interconnecting the switching modules is provided so that the number of interconnected switching modules may be varied with a minimum of recabling.

Each of the switch modules illustratively comprises a copy network, a set of broadcast and group translators, a distribution network and a routing network. Broadcast packets are replicated in the copy network. Each copy of a broadcast packet that leaves the cop network is provided with a destination address by one of the broadcast and group translators. The distribution and routing network then route the packet copies to their destinations. A method for adding or deleting destinations from a given broadcast channel is provided.

The copy, distribution and routing networks each comprise an array of nodes arranged in stages. An algorithm is provided which enables each node in the copy network to decide whether or not to replicate a given broadcast packet. Packets belonging to point-to-point connections pass through the copy network unchanged.

In order that the bandwidth of a particular connection is not limited by the bandwidth of an individual data link in the network, individual data links may be grouped together to form a link having a bit rate higher than that of any individual data link in the group. A method and apparatus for grouping individual data links and for distributing packets among the individual links in the group is discussed below.

DESCRIPTION OF THE DRAWINGS

FIG. 7 summarizes the timing for the switch module of FIG. 6;

FIGS. 8 and 9 schematically illustrate a bit addressable routing network for use in the switch module of FIG. 6;

FIG. 19 illustrates the interconnect circuitry used to interconnect the switch modules of FIG. 18, in accordance with an illustrative embodiment of the present invention.

DETAILED DESCRIPTION OF THE INVENTION

1. Overall Network Architecture

Figure 1:
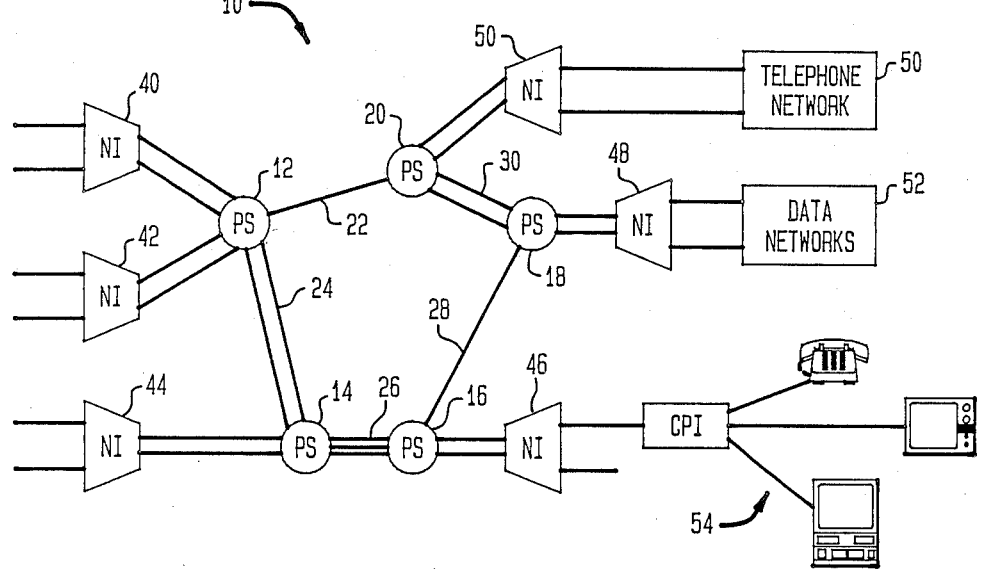
FIG. 1 schematically illustrates a packet switching network having broadcast capability in accordance with an illustrative embodiment of the invention.

The architecture of a packet switching network is illustrated in FIG. 1. The network 10 comprises an array of packet switches 12, 14, 16, 18, 20 which are illustratively interconnected by one or more high performance data links 22, 24, 26, 28, 30. Illustratively the data links are bidirectional fiber optic data links. The fiber optic links have a higher bandwidth capability than conventional non-optical electronic links. In FIG. 1, the packet switches 18 and 16 are connected by a single fiber optic link while the switches 14 and 16 are connected by three fiber optic links. Access to the network is provided by network interfaces 40, 42, 44, 46, 48, 50 which are connected to the packet switches 12, 14, 16, 18, 20 by way of fiber optic links. The network interfaces serve to interface other networks such as telephone network 50, data network 52 and customer premises equipment 54 with the packet switching network 10.

The network 10 of FIG. 1 provides two main communication services. First, a user may set up a two-way point-to-point channel with any other user. The point-to-point channel is in the form of a virtual circuit which passes through any number of the packet switches 12, 14, 16, 18, 20. Any user may also set up a broadcast service that other users are connected to. The method by which such broadcast channels are handled by the network is discussed below.

Thus, the packet switching network 10 can be used to provide voice, data and video communication on a large scale. An important feature of this network 10 is its broadcast capability which makes it suitable for a wide range of applications including television distribution and conferencing.

2. Packet Switch Module

The basic packet switching capability of the packet switches 12, 14, 16, 18, 20 comprising the network 10 is provided by a high performance switch module. Groups of switch modules may be interconnected to form the packet switches 12, 14, 16, 18, 20 and the network interfaces 40, 42, 44, 46, 48, 50 of FIG. 1. Interconnection circuitry, discussed in greater detail below, is provided so that the number of interconnected switch modules may be easily changed with a minimum of recabling.

Figure 2:
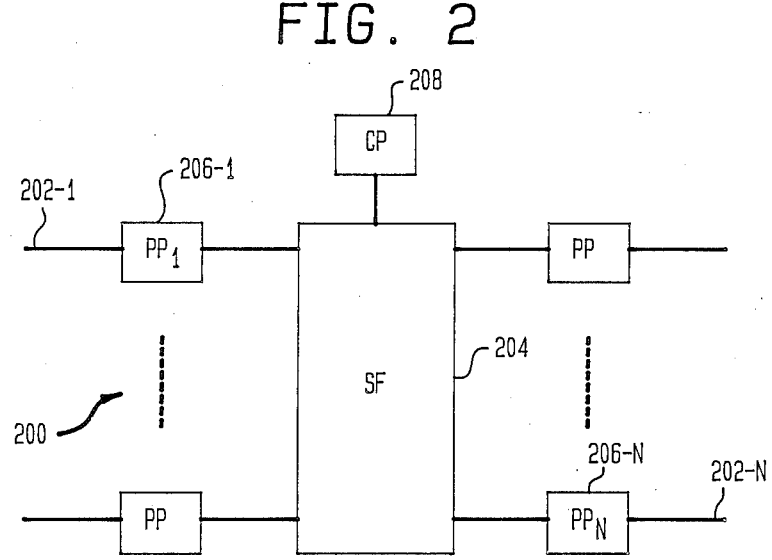
FIG. 2 schematically illustrates a packet switch module having broadcast capability for use in the network of FIG. 1.

The overall structure of the switch module is shown in FIG. 2. The switch module 200 illustratively terminates up to N bidirectional fiber optic links 202-1 . . . 202-N. Typically, N is on the order of 63 and each fiber optic link operates at up to 100 Megabits/sec.

The switch fabric 204 is the heart of the switch module 200. The high bit rate optical fiber links 202-1 . . . 202-N interface with the switch fabric 204 by means of packet processors 206-1 . . . 206-N.

Typically, a packet being transmitted over a point-to-point connection enters the switch fabric 204 from one of the fiber optic links via one of the packet processors and leaves the switch fabric through another of the packet processors and associated fiber optic link. A broadcast packet enters the switch fabric through one packet processor, is replicated in the switch fabric and leaves via a number of packet processors and associated fiber optic links.

The packet processors perform link level protocol functions including the determination of how each packet is routed through the switch fabric. Routing information is stored in memories contained within each packet processor. The connection processor 208 is responsible for establishing connections including both point-to-point connections and broadcast connections.

To do this, the connection processor 208 exchanges control packets with connection processors in neighboring switch modules and controls the routing actions of the packet processors and the switch fabric by writing routing information into memory tables contained therein. Illustratively, the connection processor 208 is a stored program machine such as a microprocessor.

3. Packet Protocol

Figure 3:
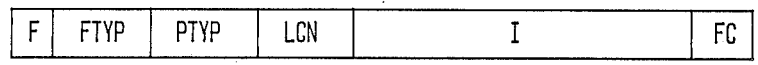
FIGS. 3 and 4 illustrate packet formats for the network of FIG. 1 and the switch module of FIG. 2.

FIG. 3 shows the format of a data transfer packet that is being transmitted between a pair of switch modules within a single packet switch or network interface or that is being transmitted between switching modules in adjacent packet switches and/or network interfaces. Illustratively, these packets may be 600 bytes long and are separated by a flag pattern (F). The Frame Type (FTYP) field is used to distinguish among several types of packets at the link protocol level including, for example, outgoing test packets, incoming test packets, and a packet belonging to a point-to-point or broadcast connection. Test packets are used to test the operation of a fiber optic link or a switch fabric. (See, for example, Turner, U.S. Pat. No. 4,486,877.)

Figure 4:
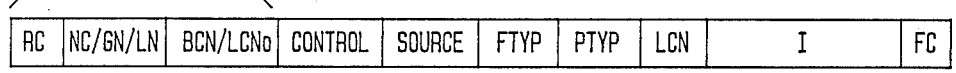

The packet type field (PTYP) identifies each packet as either a data packet or a control packet and contains a congestion control sub-field (not shown) used to inform the network interfaces and customers of internal network congestion. The logical channel number field (LCN) indicates which point-to-point or broadcast connection a packet belongs to. The packet also includes an information field I which illustratively is 594 bytes long and contains the user or control information to be transmitted. A frame check field (FC) at the end of the packet is used for error correction FIG. 4 shows the format of the packets after they enter a switch module. Flags are removed and new header information is added to the packet, which enables the packet to be routed through the switch module. Illustratively, each packet is 606 bytes long after it enters a switch module. The new header information includes a routing field (RF) which determines the routing of the packet through the switch module. The routing field (RF) comprises three subfields. The first subfield is a routing control field (RC) which determines the type of routing a packet will receive in the switch module. The following are the types of routing a packet may undergo in a switch module:

(a) point-to-point routing without group number (GN) translation, (designated herein by the letter L), or (b) point-to-point routing with group number (GN) translation (designated herein by the letter G), or (c) broadcast routing.(designated herein by the letter B).

(Group translation is discussed in detail below but for now a group number (GN) may be considered as identifying a group of fiber optic links which are grouped together to provide a connection of larger bandwidth than a single fiber optic link.) The interpretation of the next two sub-fields depends on the RC field. For broadcast routing (i.e. for packets belonging to a broadcast connection), the second sub-field is the number of copies (NC) to be produced in the switch module, i.e. the number of outgoing fiber optic links which require a copy of the packet and the third field is a Broadcast Channel Number (BCN) which is used to distinguish between different broadcast channels within the switch module. For point-to-point packets (i.e. for packets belonging to a point-to-point connection) the second field is interpreted as the outgoing fiber optic link number (LN) or outgoing group number (GN) depending on whether or not there is group translation and the third field is interpreted as an outgoing logical channel number ($LCN_o$), i.e. the logical channel number the packet will have when it leaves the switch module.

The control field (CONTROL) identifies different types of packets within the switch module including various sorts of control packets. The source field (SOURCE) identifies the packet processor of origin within the switch module.

Logical channel translation is the process used to determine how to route a packet belonging to a particular broadcast or point-to-point connection through a switch module. Each packet processor contains a logical channel translation table (LCXT) which is used for this purpose. When a packet of the type shown in FIG. 3 is received by a packet processor, its LCN is used to index the LCXT which stores the RC, NC/GN/LN, and $BCN/LCN_o$, routing information discussed above. This information is read from the LCXT and written in the packet header. The entries in the LCXTs are maintained by the connection processor (see FIG. 2) which typically writes a new LCXT entry when a new connection is established.

4. Packet Processor

Figure 5:
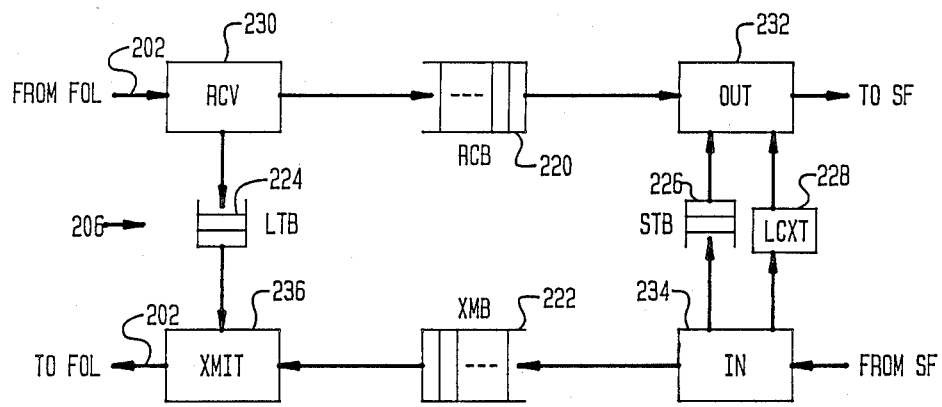
FIG. 5 schematically illustrates a packet processor for use in the switch module of FIG. 2.

The structure of one of the packet processors 206-1 . . . N is shown in FIG. 5. The packet processor 206 of FIG. 5 serves to interface one of the bidirectional fiber optic links 202-1 . . . 202-N with the switch fabric 204 of FIG. 2.

The packet processor of 206 of FIG. 5 comprises four packet buffers 220, 222, 224, 226. The receive buffer 220 is used for packets arriving on the fiber optic link 202 and waiting to pass through the switch fabric. The transmit buffer 222 buffers packets arriving from the switch fabric 204 that are waiting to be sent out on the fiber optic link 202. The link test buffer 224 and switch test buffer 226 provide paths for test packets used to verify the operation of the fiber optic link 202 and switch fabric 204, respectively. The logical channel translation table LCXT 228 is a memory which stores packet routing information as discussed above.

The receive circuit 230 converts the incoming serial optical signal transmitted over the optical fiber link 202 to an electrical signal in an eight bit parallel format, synchronizes the signal to the local clock, routes test packets to the link test buffer 224 and other packets to the receive buffer 220. Advantageously, the eight bit parallel signal format is the signal format used by the switch fabric.

The output circuit 232 takes packets from the receive buffer 220 and uses the LCN contained therein to address the logical channel translation table memory (LCXT) 228. The RC, NC/LN/GN, and $BCN/LCN_o$, fields are read from the logical channel translation table memory (LCXT) 228 and written into the packet header as shown in FIG. 4. The SOURCE field is filled in by the packet processor 202 based on the packet processor identification number. The CONTROL field is calculated by the output circuit based on information contained in the packet. The packet is then sent on to the switch fabric 204.

The input circuit 234 receives packets from the switch fabric 204 and sends them to the transmit buffer 222. The input circuit removes the RC, NC/LN/GN and $BCN/LCN_o$ sub-fields which served to route the packet through the switch fabric while moving the $LCN_o$ number to the position occupied by the LCN. The input circuit 234 also routes switch fabric test packets through the switch test buffer 226 to the output circuit 232.

When a new broadcast or point-to-point connection is added, the LCXT of the packet processor needs to be updated. This is accomplished by having the connection processor 208 form an LCXT update packet, which is transmitted from the connection processor through the switch fabric 204 to the input circuit 234. The input circuit 234 then writes appropriate information from the LCXT update packet in the LCXT memory.

The transmit circuit 236 takes packets from the transmit buffer 222, adds the flag field (F) and converts the 8 bit parallel electrical signal into a serial optical signal for transmission over the fiber optic link 202.

A similar although not identical packet processor is disclosed in U.S. Pat. No. 4,488,289.

5. Switch Fabric

Figure 6:
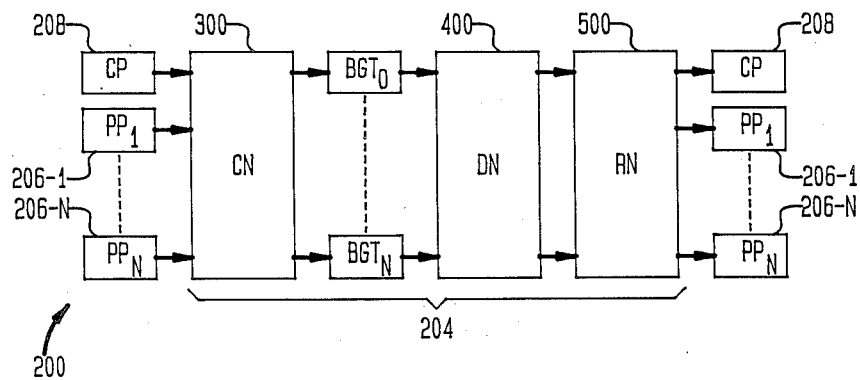
FIG. 6 is a more detailed illustration of the switch module of FIG. 2.

A more detailed view of the switch module 200 of FIG. 2 is shown in FIG. 6. Connected to the switch fabric 204, are packet processors 206-1 . . . 206-N and connection processor 208. (For purposes of clarity, the connection processor and the packet processor are each shown twice, once at the input or left hand side of the switch fabric 204 and one at the output or right hand side of the switch fabric 204. In reality, however, the switch fabric has a closed geometry and there is only on set of packet processors and one connection processor.)

The switch fabric 204 contains four major components, a copy network (CN) 300, a set of Broadcast and Group Translators $BGT_o$ . . . $BGT_N$, a distribution network (DN) 400, and a routing network 500. The copy network 300, the distribution network (DN) 400 and the routing network (RN) 500 each comprise arrays of switching nodes. Illustratively, each of the nodes has two inputs and two outputs. Alternatively, each of the switching nodes may have four inputs and four outputs. The switching nodes are grouped in stages. Data packets are synchronously transmitted downstream from one stage to the next. Grant signals propagate upstream to inform upstream nodes whether or not downstream nodes in adjacent stages are able to receive data packets.

Illustratively, the switch fabric 204 runs at a rate of 25 Megabits/sec. and has eight bit wide internal data paths. This gives an effective bit rate of 200 Megabits/sec on the internal data paths, roughly twice the speed of the fiber optic links which operate at 100 Megabits/sec. An occupancy of 80% on the fiber optic links translates to a 40% occupancy on the internal data paths of the switch fabric 204, which keeps contention and delay low in the switch fabric.

The purpose of the copy network 300 is to copy broadcast packets. When a broadcast packet having k destinations passes through the copy network 300, it is replicated so that k copies of that packet emerge from the copy network. Point-to-point packets pass through the copy network 300 without change.

One purpose of the Broadcast and Group Translators is to make sure that each packet has a Link Number (LN), which number is essentially the address of the outgoing packet processor and fiber optic link for the packet. To accomplish this, the Broadcast and Group Translators $BGT_o$ . . . $BGT_N$ perform two translation functions. First, for each arriving broadcast packet, they determine the proper outgoing link number (LN) or group number (GN) based on the number of copies (NC) and Broadcast Channel Number (BCN) fields in the broadcast packet. The group number (GN), if any, is then translated to a link number (LN). Group translation also takes place for point-to-point packets having group numbers (GN). The BGT's do nothing to point-to-point packets already having link numbers (LN) and not requiring group translation.

The group number (GN) is used to allow individual fiber optic links which join the same pair of switch modules to be grouped together and treated as one large link. This allows the system to provide connections that have a larger bandwidth than a single link. Consequently, the bandwidth of the fiber optic links does not limit the size of connections the system can provide. To provide this grouping function, group translators within the BGT's translate group numbers to link numbers so as to distribute traffic evenly over all links in a group. More particularly, a group number (GN) is sucessively translated to the link number of each link in the group to achieve the uniform traffic distribution. The group translation function is described in greater detail below.

In short, each broadcast or point-to-point packet leaving the BGT's has a link number (LN) which is essentially the address of the appropriate outgoing packet processor. For point-to-point packets not requiring group translation, the link number (LN) is added to the packet header from the LCXT memory in the incoming packet processor and the BGT does nothing. For point-to-point packets requiring group translation, the link number (LN) is provided by the BGT as a result of translation of the group number (GN). For broadcast packets, the link number LN is provided by the BGT as a result of translation of the broadcast channel number (BCN) possibly followed by group translation of a group number (GN). The routing network 500 routes the packets to the appropriate outgoing packet processors based on the aforementioned link number (LN) which is essentially an address of an outgoing packet processor and fiber optic link. The distribution network 400 is provided to prevent internal congestion within the routing network 500.

6. Timing

The operation of the switch fabric 204 is synchronous. The timing is summarized in FIG. 7 for the case where each switch packet is 606 bytes long and the copy routing and distribution networks are 64×64 networks comprising 6 stages of 2×2 switching nodes each.

At the start of a packet cycle, packets enter the copy network 300 from the packet processors. 96 clock cycles later they enter the BGT's. 64 cycles later they enter the distribution network 400. 96 cycles later they enter the routing network and 96 cycles after that the packets begin to enter the appropriate outgoing packet processors. 400 clock cycles after the start of the packet cycle, grant signals are presented to the last stage of the routing network 500. 48 cycles later grant signals are presented at the last stage of the distribution network 400. After an additional 48 cycles grant signals are presented at the BGT outputs and 4 cycles later grant signals are presented to the last stage of the copy network. A new packet cycle starts with an input to the copy network 300 at clock cycle number 608.

7. Routing Network

The routing network is discussed first because it is the easiest network to understand and because it provides a basis for understanding the distribution and copy networks.

In FIG. 8, a 16×16 version of the routing network 500 is illustrated. The 16×16 version of the routing network comprises four stages 502, 504, 506, 508, each stage comprising eight nodes. Each of the nodes, for example the node 510, has two inputs 511,513 and two outputs 515,517. A packet entering the node 510 on either input will be routed to the upper or lower output, depending on whether the appropriate address bit is a zero (upper output) or one (lower output).

Thus, the routing network 500 is bit addressable, i.e. the route a packet takes through the network is determined by successive bits of its destination address. FIG. 8 shows two different paths 520, 530 to the destination (e.g. packet processor) having address 1011. Thus, in the stage 502, the packets in paths 520, 530 are routed to the lower output port of the appropriate node as the first bit of the destination address is a one. In the stage 504, the packets are routed to the upper output port of the appropriate node as the second destination address bit is zero. Similarly, in the third and fourth stages 506, 508, the packets are routed to the lower output ports as the third and fourth address bits are both one. This self-routing property is shared by a variety of networks including delta, shuffle exchange, and banyan networks. Such self-routing bit addressable networks are disclosed in U.S. Pat. No. 4,494,230.

8. Distribution Network

Figure 9:
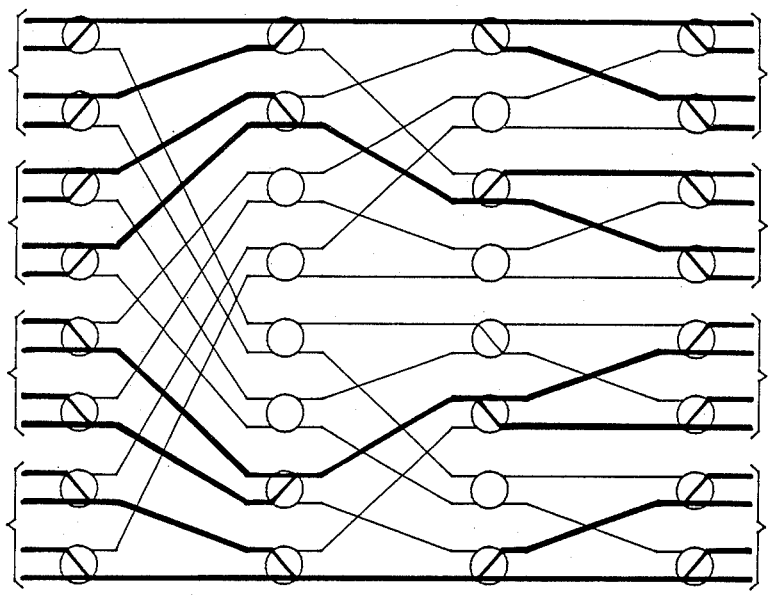

One problem with binary routing networks such as the binary routing network illustrated in FIG. 8 is that they can become congested in the presence of certain traffic patterns. This is illustrated in FIG. 9, which shows a traffic pattern corresponding to several communities of interest. In the traffic pattern of FIG. 9, all traffic entering the first four inputs is destined for the first four outputs and all traffic entering the second four inputs is destined for the second four outputs. There is a similar distribution of traffic entering the third and fourth groups of four inputs in FIG. 9. With this traffic pattern, only one fourth of the links joining the second and third stages of the network in FIG. 9 are carrying traffic. Thus, if the inputs are heavily loaded, those links carrying traffic between the second and third stages will be hopelessly overloaded and traffic will back up.

The distribution network 400 solves this problem by evenly distributing packets it receives across all its outputs. The distribution network 400 has an internal structure similar to that of the routing network 500. However, the nodes of the distribution network ignore the destination addresses on packets and route them alternately to each of their output ports. If one or both ports is unavailable, the first port to become available is used. This approach breaks up any communities of interest and makes the combination of the distribution network 400 and routing network 500 robust in the face of pathological traffic patterns.

9. Copy Network

Figure 10:
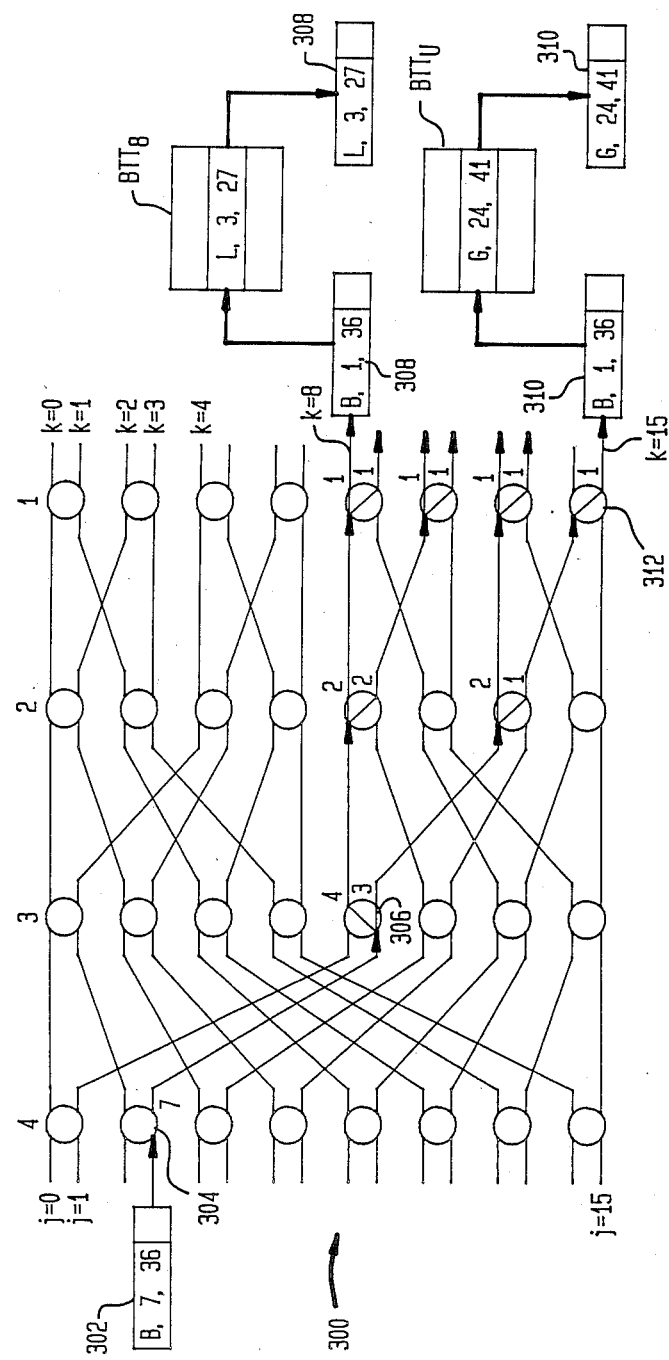
FIG. 10 schematically illustrates a packet copy network for use in the switch module of FIG. 9.

Turning to FIG. 10, the copy network 300 is illustrated. The function of the copy network is to make copies of broadcast packets as they pass through. The packet 302 entering at left is a broadcast packet as indicated by the letter B in the routing control sub-field. The number of copies (NC) field is 7 and the broadcast channel number (BCN) is 36. Thus, the copy network 300 must make seven copies of the packet 302 which belongs to broadcast channel number 36.

Like the distribution network 400, and the routing network 500, the copy network 300 comprises an array of nodes (e.g. node 304, 306) having two input ports and two output ports. The network 300 of FIG. 10 is a 16×16 network having 16 input ports labeled j=0, 1 . . . 15 and 16 output ports labeled k=0, 1 . . . 15. The array of nodes 300 is divided into stages which are labeled 1, 2, 3, 4 from right to left for reasons which will become clear.

The nodes of the copy network differ from the nodes of the routing and distribution network only in that a different algorithm is used to determine which output port a packet utilizes. In some cases a packet will leave via one output port. In other cases, the packet will be replicated by the node and leave the node via both output ports. In one example, the packet 302 enters node 304 at the lower input port (j=3) and leaves via the lower output port. At the node 306, the packet 302 is replicated. It enters via the lower input port and leaves via both output ports.

The following algorithm is used by the nodes in the copy network to route packets. In the algorithm, BCN and NC are the broadcast channel number and number of copies fields from the packet as indicated above. sn is the stage number of the node where stages are numbered from right to left starting with 1.

If $NC > 2^{sn-1}$, simultaneously send the packet out from both output ports.

If BCN is even, the NC field of the upper packet is set to the integer part of (NC+1)/2 and the NC field of the lower packet is set to the integer part of NC/2.

If BCN is odd, the NC field of the upper packet is set to the integer part of NC/2 and the NC field of the lower packet is set to the integer part of (NC+1)/2.

If $NC \leq 2^{sn-1}$, or if the packet is a non-broadcast packet, use the distribution network algorithm. As indicated above, the nodes in the distribution network alternately transmit packets out of the upper and lower output ports.

Note that this algorithm delays splitting packets as long as possible. Another option is to split the packets early. However, this approach can lead to congestion in the copy network 300. The late-splitting algorithm avoids this problem.

This algorithm is easily applied to nodes 304 and 306 of FIG. 10. At node 304 the BCN is 36, NC is 7 (these are in the packet header) and the stage number sn is 4. At node 304 NC=7 is smaller than $2^{sn-1}=8$. Thus, we use the algorithm of the distribution network which involves a random routing of the packet to either the top of bottom output port.

In node 306, NC (=7) is larger than $2^{sn-1}$ (=4). In this case the packet is sent out through both output ports. Note that the BCN for the packet entering node 306 is 36, an even number. Thus, the NC field for the upper outgoing packet is set to the integer part of (NC+1)/2 =4 and the NC field of the lower outgoing packet is set to the integer part of NC/2=3.

In this manner seven copies of packet 302 are produced by the network 300. These packets leave via output ports k=8, 9, 10, 11, 12, 13, 15.

10. Broadcast Translation

When broadcast packets emerge from the copy network 300, their final destination (i.e. their outgoing fiber optic link and their outgoing packet processor) has yet to be determined. It is a function of the broadcast and group translators (BGT's) shown in FIG. 6 to determine where each packet coming out of the copy network should go (i.e. the BGTs supply the link number L which is the address of the destination packet processor). As shown in FIG. 6, there is one BGT for each output of the copy network 300. Once a destination for a packet is determined by the appropriate BGT the distribution and routing network 400, 500 route the packet to its destination.

Each BGT contains a broadcast translation table (BTT) used for this purpose. The BTT is indexed by the BCN of the incoming broadcast packet. The selected entry in the BTT contains the appropriate group number (GN) or link number (LN) and outgoing logical channel number ($LCN_o$) for the packet, which numbers are written into the appropriate fields of the packet header. The link number (LN) is used to route the packet through the routing network to the appropriate outgoing packet processor and fiber-optic link. When the group number is used, a further translation step is required to obtain the link number (LN). The $LCN_o$ is used to read the logical channel translation table (LCXT) in the next switch module traversed by the packet.

Note that two BGT's need not have identical entries in their broadcast translation tables (BTTs) for a given BCN. This point is illustrated in FIG. 10 which shows the broadcast translation process for two packets coming out of the copy network 300 at output ports k=8 and k=15 respectively.

Packets 308 and 310 are copies of packet 302. The only difference is that the NC field of each packet has been reduced to 1 as a result of the decision making algorithm used by the nodes in the copy network. The BCN of packets 308 and 310 is 36. Packet 308 indexes $BTT_8$, while packet 310 indexes $BTT_{15}$, both of which are part of the BGT's for the appropriate outputs of the copy network. Even though both packets have the same BCN, the packets 308 and 310 acquire different group or link numbers (GN or LN) and different outgoing logical channel numbers ($LCN_o$).

As a result of the broadcast translation, an "L" is written into the routing control field (RC) of packet 308 to designate that after broadcast translation the packet is now a point-to-point packet not requiring group translation. Packet 308 acquires a link number LN of 3 and an $LCN_o$ of 27. As a result of the broadcast translation process, a "G" is written into the routing control field (RC) of packet 310, indicating that after broadcast translation the packet 308 is now a point-to-point packet requiring group translation. Packet 310 acquires a GN of 24 and an $LCN_o$ of 41. The group number 24 means that the packet 310 will be routed to one link in a group of links designated by number 24. The group number 24 is translated into the link number of one of the links in the group in a manner so that packets are evenly distributed to all of the links in a group. Thus, the packets 308, 310 are routed to different outgoing packet processors by the routing network 500.

One property of the routing algorithm used by the nodes in the copy network is that certain routing decisions are essentially random. For example, the routing decision by node 304 was random. For example, had the node 304 routed the packet 302 to its upper output port, instead of its lower output port, the packets might have appeared at output ports k=0, 1, 2, 3, 4, 5, 7 instead of at output ports k=8, 9, 10, 11, 12, 13, 15.

Node 312 also made a random routing decision. Had node 312 routed packet 310 to its upper output port instead of its lower output port, the packet 310 would have appeared at port k=14 instead of port k=15.

Since the appearance of packet 310 at port k=14 or k=15 is a random event, the $BTT_{14}$ and $BTT_{15}$ associated with the output ports k=14, k=15, respectively, must have the same entry for when the BCN is 36. This is necessary so that the packet 310 goes to the same final destination whether it appears at output port k=14 or output port k=15. For the same reason, the following pairs of broadcast translation tables should have the same entry for the address BCN=36.

$BTT_0$, $BTT_8$
$BTT_2$, $BTT_9$
$BTT_2$, $BTT_{10}$
$BTT_3$, $BTT_{11}$
$BTT_4$, $BTT_{12}$
$BTT_5$, $BTT_{13}$
$BTT_6$, $BTT_{14}$
$BTT_6$, $BTT_7$
$BTT_{14}$, $BTT_{15}$

It is possible to predict which output ports of copy network 300 require the same BTT entry for a given BCN from knowledge of the routing algorithm used by the nodes in the copy network.

Output ports of the copy network 300 which require the same BTT entry for a given BCN have the same broadcast copy index or bci. The bci for a particular output port is a function of the NC field and the low order bit of the BCN. We use the notation $bci_k$ (NC, BCN) to denote the bci of the output port k for a particular combination of NC and BCN. Again, the $bci_k$(NC, BCN) function is chosen so that output ports with the same bci will have the same BTT entry for identical BCN numbers.

An example of an algorithm used to compute the function $bci_k$ (NC, BCN) is as follows:

---
Calculation of $bci_k$ (NC, BCN) for even BCN

Let $b_{n-1}, b_{n-2}...b_1 b_0$ be the binary representation k, the output port number for the copy network.
Let the initial value of s be zero.
Let the initial value of x be NC.
for i = n − 1 down to zero
  if $x > 2^i$ then
    if $b_i = 0$ then x = the integer part of (x + 1)/2
    else s = s + the integer part of (x + 1)/2
      x = the integer part of x/2
    end if
  end if
end for
Now s = $bci_k$ (NC, BCN).

---

Calculation of $bci_k$ (NC, BCN) for odd BCN

Let $b_{n-1}...b_1, b_0$ be the binary represention of k.
Let the initial value of s be zero.
Let the initial value of x be zero.
for i = n − 1 down to zero
  if $x > 2^i$ then
    if $b_i = 0$ then x is integer part of x/2
    else s = s + the integer part of x/2

---
      x = the integer part of (x + 1)/2
    end if
  end if
end for
Now end for s = $bci_k$ (NC, BCN).

---

The aforementioned algorithm may be used as follows to calculate $bci_3$ (7, 36).

The binary representation of 3 is 0011. The initial value of s is 0 and the initial value of x is 7. During the first iteration of the for-loop, i=3. Since $x \leq 2^i (7 \leq 2^3 = 8)$, the values of s and x are not changed on the first iteration. During the second iteration of the for-loop i=2. Since $x \leq 2^i (7 \leq 2^2 = 4)$ and bi =0, the value of x is changed to 4 (the integer and s is unchanged. During the third iteration of the for-loop i=1. Since $x > 2^i (4 > 2^1 = 2)$ and $b_i = 1$, the value of s is changed to 2 (0+the integer part of (pb 4+1)/2) and the value of x is changed to 2 (the integer part of 4/2). During the fourth (final) iteration of the for loop i=0. Since $x > 2^i (2 > 2^0 = 1)$ and bi=1, the value of s is changed to 3 (2+the integer part of (2+1)/2) and x is changed to 1 (the integer part of 2/2). When the for-loop is exited the value of s is 3, which is the value of $bci_3(7,36)$.

The algorithm may also be used to calculate $bci_{11}$ (7,36).

The binary representation of 11 is 1011. The initial value of s is zero and the initial value of x is 7. During the first iteration of the for-loop i=3. Since $x \leq 2^i (7 \leq 2^3 = 8)$ the values of s and x are not changed on the first iteration. During the second iteration of the for loop i=2. Since $x > 2^i (7 > 2^2 = 4)$ and $b_i = 0$, the value of x is changed to the integer part of (7+1)/2=4 and s is unchanged. During the third iteration of the for-loop i=1. Since $x > 2^i (4 > 2^1 = 2)$ and $b_i = 1$, the value of s is changed to 0 plus in integer part of (4+1)/2=2 and the value of x is changed to the integer part of 4/2=2. During the fourth and final iteration i=0. Since $x > 2^i (2 > 2^0 = 1)$ and bi=1 the value of s is changed to 2 plus the integer part of (2+1)/2=3 and x is changed to x=1 (integer part of 2/2). When the for loop is exited, the final value of s (in this case 3) is the value of $bci_{11}$ (7,36).

Note that $bci_{11}$ (7,36)=3=$bci_3(7,36)$.

Thus, when a packet with BCN=36 comes out of port k=3 or k=11, the entry in the corresponding broadcast translation table BTT will be identical and the packet will ultimately be routed to the same place.

In addition to containing a broadcast translation table (BTT), each of the BGT's shown in FIG. 6 also includes a memory table which stores values of $bci_k$ (NC, BCN) for each possible value of NC,BCN. This table is static and different for each of the BGT's (i.e. is different for each output port). Each table of bci values is used to control the writing of information into the associated BTT to insure that BTT's for ports with the same bci value as a function of NC and BCN have identical entries for that particular value of BCN.

Figure 11:
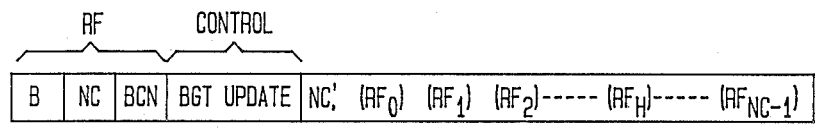
FIG. 11 is the packet format for a broadcast update packet.

In general, when a broadcast channel destination is added or deleted, the BTT's must be updated. When the connection processor wishes to update the BTT's for a particular broadcast channel, it sends a control packet of the form shown in FIG. 11. The B indicates that the packet of FIG. 11 is a broadcast packet. The copy network replicates the packet so that each BGT in the switch module receives a copy. When $BGT_k$ receives a copy, it extracts BCN from the routing field (RF) of the control packet of FIG. 11 and NC' from the information field of the packet of FIG. 11. The $BGT_k$ uses its table of bci values to compute $h=bci_k$ (NC', BCN). Finally, $RF_h$ is copied from the packet into $BTT_k$ (BCN), wherein $RF_h$ includes the RC, GN/LN and LCN fields included in the broadcast translation table (BTT) as discussed above. (The reason why NC' is included in the information field of the broadcast packet is as follows. The broadcast update packet of FIG. 11 originates in the connection processor of the switch module. It is replicated in the copy network and it goes to each of the BGTs. As a result of the copy network routing algorithm discussed in section 9 above, the NC value in the outgoing field of each copy of the broadcast update packet is 1 when the copy leaves the copy network. Thus, the value NC' is placed in the information field of the broadcast update packet for purposes of indexing the table of bci values.)

Using this scheme, the connection processor 208 of the switch module 200 keeps a copy of the BGT update control packet in its memory. To add a new destination, it increments the NC' field, adds a new RF to the end of the packet and sends it intothe copy network for replication and transmission to the BGT's. To remove a broadcast destination, the CP decrements the NC' field and removes the RF corresponding to the deleted destination from the BTT update packet before sending it out. Typically, if the RF field removed is not the last one in the packet, then the last one is copied to the position of the removed RF. That is, if we want to eliminate $RF_i$ for $i<NC'-1$, we copy $RF_{NC'-1}$ to the position formerly occupied by $RF_i$.

11. Link Groups and Group Translation

Each of the BGT's may contain an additional memory table known as the Group Translation Table (GTT). As discussed above, the purpose of group translation is to allow individual fiber-optic links which join the same pair of switch modules to be grouped together and treated as one large link. This allows the system to provide connections that have a larger bandwidth than a single link. Consequently, the bandwidth of the individual fiber optic links does not limit the size of connections the system can provide.

Traffic for a link group is evenly distributed over all its links. This allows dynamic load distribution across a set of links permitting higher utilization.

When a BGT receives a point-to-point packet requiring group translation, the packet will contain a group number (GN) as part of its routing information. The group translation table (GTT) in each BGT identifies the links in each group and also contains a pointer to a particular link in each group. Every time a packet for a particular group is handled, the GN number is translated to the link number (LN) of the link indicated by the pointer and the pointer is advanced to the next link in the group. The next packet belonging to the group has its GN number translated to the new LN indicated by the pointer. (Recall, that the LN is essentially the address of an outgoing packet processor and associated fiber optic link). In this manner the traffic is evenly distributed across the links in the group. Broadcast packets having GN numbers are handled similarly, but they must first go through the broadcast translation process.

One consequence of link groups is that the logical channel translation tables (LCXTs) (memory 228, FIG. 5) for all links in a group are identical. Consequently, for every new connection, the connection processor updates the LCXT's for all links in the group. This can be easily handled by sending a broadcast LCXT update packet.

Figure 12:
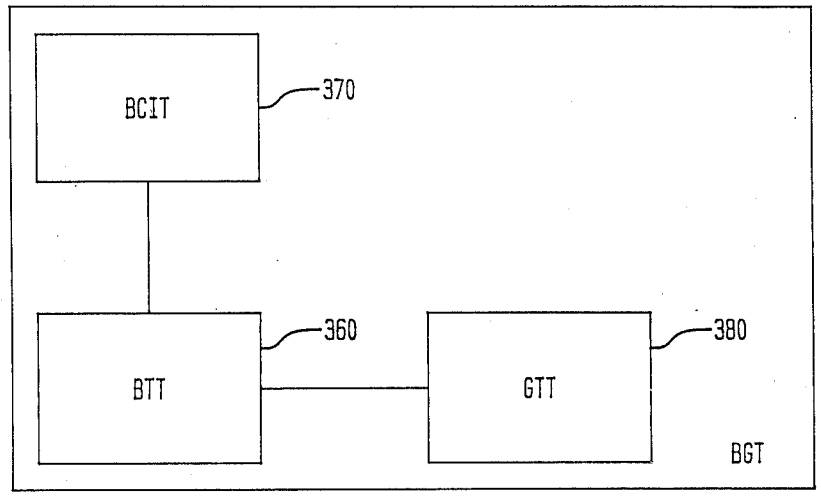
FIG. 12 schematically illustrates a broadcast and group translator for one of the switch modules of FIG. 6.

In short, each BGT contains three main memories, the Broadcast Translation Table (BTT) for converting the broadcast channel number (BCN) in broadcast packets to link or group numbers, the BCIT or broadcast copy index table for controlling the writing of information into the associated BTT and for updating the BTT when a broadcast destination is added or deleted, and a group translation table (GTT) for translating group numbers to link numbers. Such a BGT is shown in FIG. 12 and includes BTT 360, BCIT 370 and GTT-380.

12. Illustrative Example

Figure 13A:
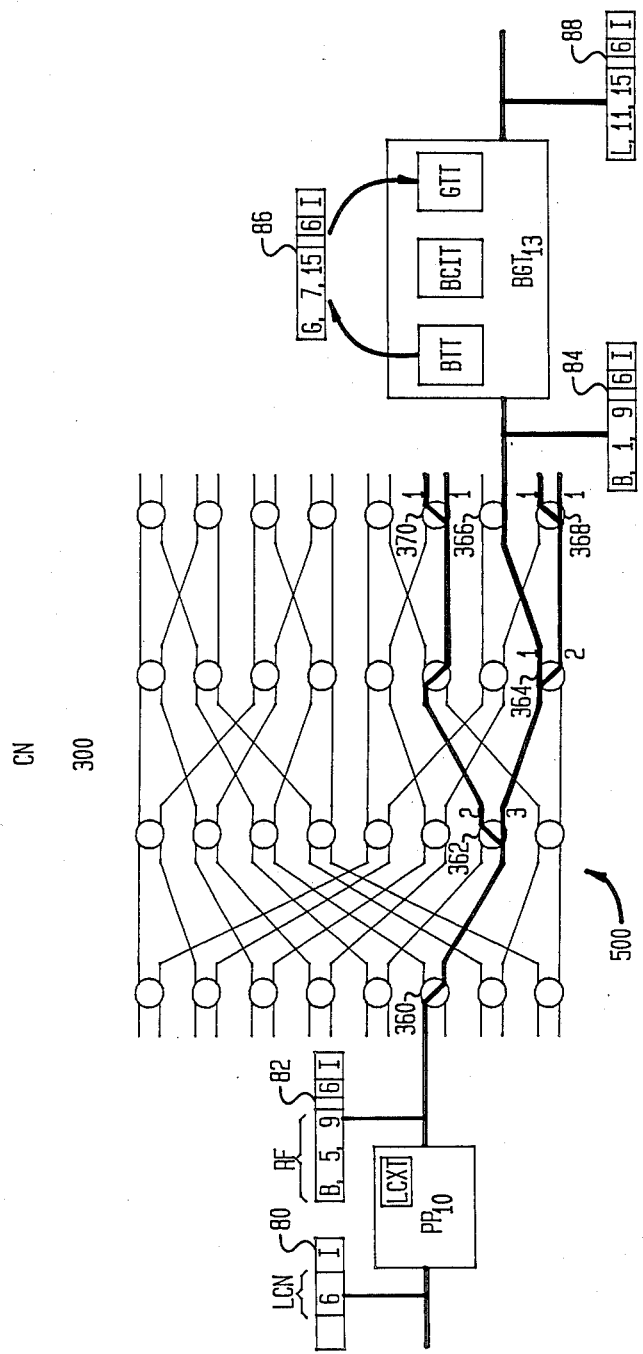
FIGS. 13 (a) and 13 (b) illustrate the processing of a broadcast packet by a switch module comprising copy, distribution, and routing networks in accordance with an illustrative embodiment of the present invention.

A final example of the routing of a packet through a switch module 200 is illustrated in FIGS. 13 (a) and 13 (b) FIG. 13 (a) shows a packet 80 arriving on fiber-optic link number 10 and entering packet processor $PP_{10}$. The packet 80 has a logical channel number (LCN) of 6. As was described earlier, the packet processor $PP_{10}$ uses the LCN value to index the LCXT contained in the $PP_{10}$ to retrieve packet routing information stored therein. The retrieved routing information is placed in the routing field of the packet 82 as it leaves $PP_{10}$. The routing field of the packet indicates a broadcast packet (B) with a Number-of-copies field (NC) of 5 and a Broadcast Channel Number (BCN) of 9. The packet enters the copy network 300 and is replicated so that five copies emerge from the copy network 300.

The packet 82 uses the upper input of node 360 of the copy network 300 and is routed to the lower output of node 360 without replication. Replication takes place at nodes 362, 364, 368 and 370 of the copy network, while a packet passes through node 366 without replication. Whether or not replication takes place at a given node in the copy network is decided in accordance with the copy network routing algorithm described in Section 9 above. The copy labelled 84 arrives at $BGT_{13}$. Note that packet 84 has a 1 in its NC field as a result of repeated application of the copy network routing algorithm disclosed in section 9 above. The packet 86 requires group translation (indicated by the G) and is destined for link group 7. The outgoing logical channel number ($LCN_o$) is 15. $BGT_{13}$ then uses the GN (=7) to index the GTT table and select one of the links in link group 7. In the example, the selected link is number 11. Packet 88 shows the new routing field after the group translation is complete. The packet is destined for link number 11 and has an outgoing logical channel number ($LCN_o$) of 15.

Packet 88 then enters the distribution network 400 of FIG. 13 (b). The distribution network makes arbitrary routing decisions. In this case packet 88 passes through nodes 460, 462, 464, and 466. When the packet reaches the RN 500, it is routed using successive bits of the link number ($11_{10}=1011_2$). Thus it takes the lower output port of node 560, the upper output port of node 562, the lower output port of node 564 and the lower output port of node 566. This brings packet 88 to the outgoing packet processor $PP_{11}$. As described above, $PP_{11}$ removes the extra header fields from the packet and moves the outgoing logical channel number ($LCN_o$)

from the Routing Field to the LCN field of the outgoing data packet 90, thereby replacing the original LCN (=6) in packet 80 of FIG. 13 (a). Hence, the packet that emerges from $PP_{11}$ has 15 in its LCN field. The new LCN (=15) is used to index an LCXT in the next switch module traversed by the packet.

13. Node structure

Figure 14:
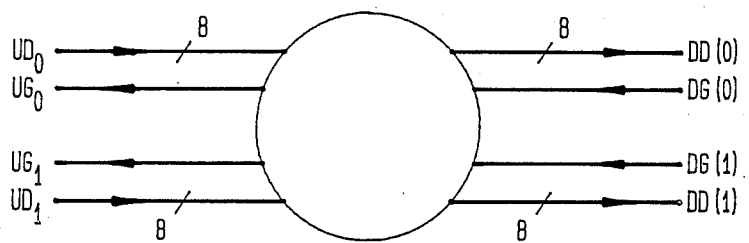
FIG. 14 schematically illustrates a node which illustratively may be incorporated in the copy, distribution or routing network of the present invention.

Each node in each of the copy, distribution and routing networks 300,400,500 has the inputs and outputs shown in FIG. 14. The upstream data signals ($ud_0$, $ud_1$) carry data from nodes in the previous stage. The downstream data signals (dd(0), dd(1)) carry data to nodes in the following stage. The downstream grant signals (dg(0),dg(1)) inform the node if its neighbors in the following stage are prepared to receive new packets. Similarly, the upstream grant signals ($ug_0$,$ug_1$) inform the neighbors in the previous stage if the node of FIG. 14 is prepared to receive new packets. The data signals are eight bits wide and the grant signals are one bit wide.

In the routing network, a packet coming in on one of the inputs $ud_o$, $ud_1$ is routed to the upper (dd(0)) or lower (dd(1)) output depending on an address bit in the packet. In the distribution network, incoming packets are routed to the upper or lower outputs on an essentially random basis. In the copy network, an incoming packet is either replicated or randomly routed to one or the other output, the decision being made using the copy network routing algorithm discussed in Section 9 above. When replication takes place, the NC number in each packet copy is changed in accordance with the copy network routing algorithm.

Figure 15:
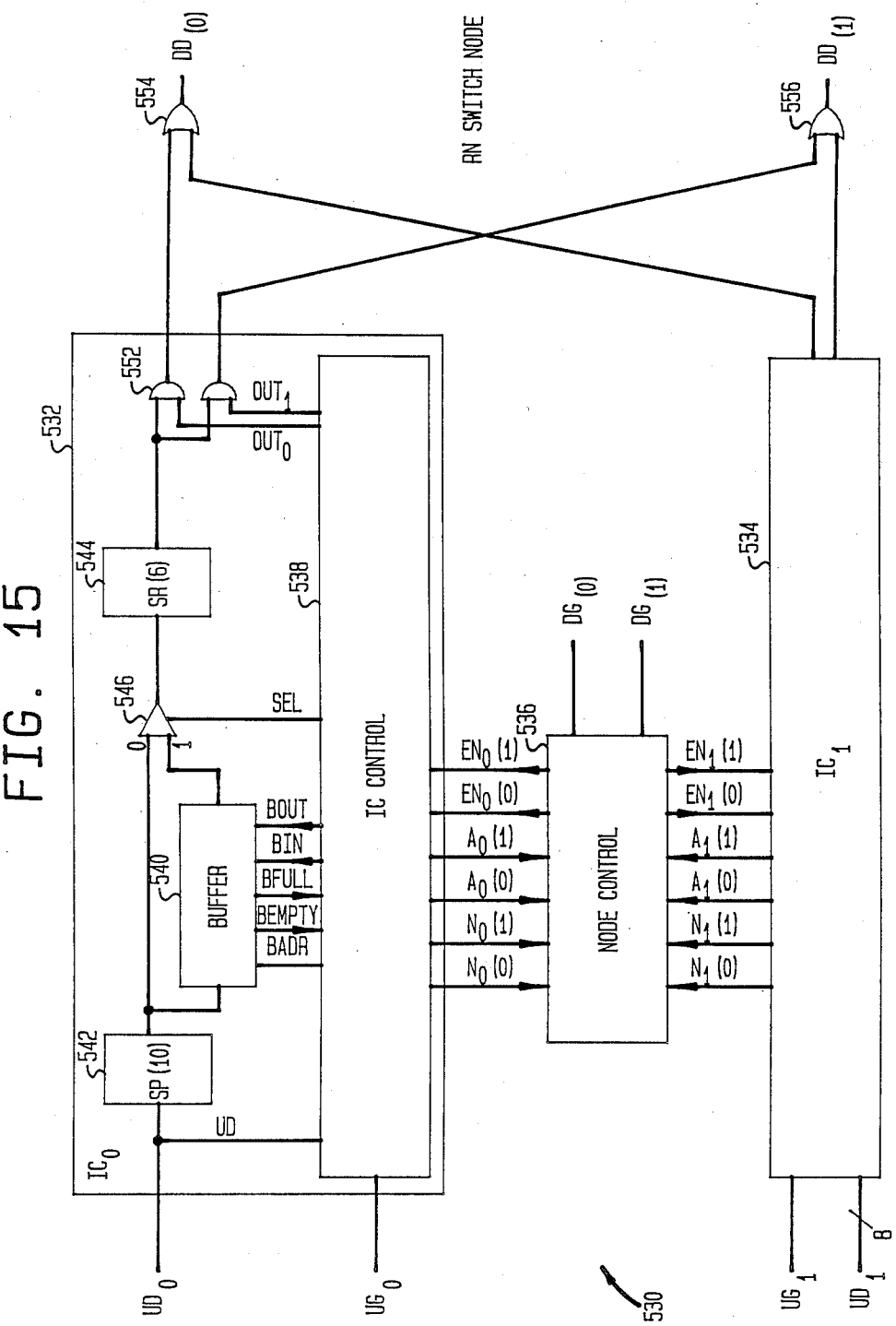
FIGS. 15, 16, 17 show in more detail the nodes which are used to form the copy, routing and distribution networks, respectively, of the switching module of FIGS. 2, 6, and 13.

FIG. 15 gives a more detailed picture of a switch node 530 for the Routing Network. The node 530 comprises two Input Circuits ($IC_0$, $IC_1$) 532 and 534 and a Node Control circuit 536. The $IC_0$ 532, contains an IC Control circuit 538 and a Packet Buffer 540 capable of storing two packets. It also contains two shift registers 542 and 544, which delay the passage of packets through the node while control decisions are made, a data selector 546 used to route either an incoming or a buffered packet to an output port dd(0) or dd(1), and a pair of And gates 552 which enable output to one of the two output ports dd(0), dd(1).

When a packet is received at one of the input circuits 532, 534, that input circuit examines the routing field (RF) to determine which of the outputs dd(0) or dd(1) the packet should be routed to and requests use of that output from the Node Control 536. The Node Control 536 makes a decision based on requests from the two input circuits 532, 534 and the state of the downstream grant signals dg(0), dg(1) and informs the two input circuits 532, 534. The input circuits 532, 534 then either send their packets to the appropriate outputs if available or they buffer them. This decision is made during the data flow portion of the packet cycle. (See FIG. 7.)

The upstream grant signals $ug_0$, $ug_1$ are computed during the grant-setting portion of a packet cycle (see FIG. 7). In general, an input circuit will assert its upstream grant lead $Ug_0$, $Ug_1$ indicating it can accept a packet during the next packet cycle if (1) its buffer is not full or (2) its buffer is full, but the first packet in its buffer is guaranteed to be able to proceed during the next packet cycle. This latter determination is made by the node control circuit 536 during grant setting portion of a packet cycle.

Thus, the node control 536 essentially makes two routing decisions during each packet cycle. During the data flow portion of the packet cycle, the node control decides whether a given packet is to be sent to an output port or is to be buffered. During the grant-setting portion of the packet cycle, the node control determines if buffered packets will be able to proceed. The result of this latter determination is used by the input circuits 532, 534 to set the upstream grant signal.

The Node Control circuit is designed to be general enough to work in all three of the networks (copy network 300, distribution network 400, routing network 500). The interface between the Node Control 536 and the input circuit 532 comprises three sets of leads. The leads $n_0(0)$, $n_0(1)$ form a two bit number that specifies the number of distinct outputs needed by each input circuit (The ability to request more than one output port is needed by the nodes in the copy network.) The IC sets the lead $a_0(0)$ high if it can use output 0 (upper output) and sets $a_0(1)$ high if it can use output 1 (lower output). (In the RN, only one of these is used at a time. The DN and CN set both.) The output from the node control circuit comprises leads $en_0(0)$ and $en_0(1)$ which leads specify which output ports a given input circuit can use. An analogous set of leads $n_1(0)$, $n_1(1)$, $a_1(0)$, $a_1(1)$, $en_1(0)$, $en_1(1)$ connect the input circuit 534 with the node control 536.

The algorithm used by the Node Control to make its routing decision is described below. It makes use of two internal tie-breaker variables $t_{in}$ and $t_{out}$ whose purpose is to ensure that both input circuits 532, 534 are treated fairly and in the case of the DN that packets are distributed evenly across the outputs. It uses two temporary variables i and j.

1. At the start of the grant-setting cycle, set $i=t_{in}$ and $j=t_{out}$, $en_0=en_1=0$. g(0) and g(1) to the values of the downstream grants.
2. Latch the input values $n_0,a_0,n_1,a_1$. (As used herein, $n_i$ designates the two bit values $n_i(0)$, $n_i(1)$; $a_i$ designates the two bit values $a_i(0)$,$a_i(1)$ and eni designates the two bit values $en_i(0)$, $en_i(1)$ where i may be equal to zero or one.)
3. While $n_0+n_1>0$ repeat the following.
    If $n_i=0$, set $i=\bar{i}$.
    Else, if ones ($a_i$  g)<$n_i$, then clear $n_i$.
    Else, if $a_i(j)$   g(j)=0, set $j=\bar{j}$
    Else, set $en_i(j)$, clear g(j), decrement
    $n_i$ and set $t_{in}=i$, $t_{out}=j$.
4. At the beginning of the data flow part of the cycle, repeat steps 2 and 3.

The function ones() in step 3, computes the number of 1 bits in its argument. Thus, ones ($a_i$  g) is the number of available outputs that can be used by $IC_i$.

There are four leads joining the IC Control circuit 538 to the Buffer 540. The lead badr is the address bit of the first packet in the Buffer (if any). The lead bempty is asserted if there are no packets in the Buffer. The lead bfull is asserted if there are two packets in the Buffer. When the lead bin is asserted by the IC Control 538, the Buffer responds by accepting an incoming packet from the shift register 542. When the lead bout is asserted by the IC Control 538, the Buffer responds by sending the first packet in its buffer to the data selector 546.

The sel lead is used by the IC Control circuit to select either an incoming packet or a buffered packet. Whichever packet is selected is passed onto the shift register 544. The leads $out_0$ and $out_1$ control which of the two output ports receive the packet.

To illustrate the operation of the RN node, assume a packet is arriving at $IC_0$ (input circuit 532) and the address bit of the packet for this stage has the value 1. The $IC_0$ control detects the presence of the packet by examining the value of the ud leads at the start of the packet cycle. It then uses these leads again to extract the LN field from the packet and based on that determines that the packet should be routed to outport port 1 (i.e. the upper output port). The IC control then sets $n_0$ to 1 requesting 1 output port from the Node Control and asserts $a_0(1)$ indicating that it needs output port 1. Based on the value of dg(1) and possible competing requests from $IC_1$, the Node Control determines if output port 1 can be made available to $IC_0$, according to the Node Control algorithm described above. Assuming that output port 1 is available, the Node Control then asserts $en_0(1)$. In response to this, the IC control sets sel to 0 which allows the incoming packet to bypass the buffer and flow through data selector 546 and shift register 544. The IC control also asserts lead $out_1$ allowing the packet to flow through to Or gate 556.

However, in certain circumstances, the output port 1 might not be available to $IC_0$. For example $IC_1$ (i.e. input circuit 534) may also request output port 1 during the same packet cycle. If the node control decides in favor of $IC_1$, based on the aforementioned node control algorithm, $IC_0$ will have to buffer its packet. Similarly, if there is congestion, and the downstream grant signals indicate that the downstream node cannot accept a packet, then $IC_0$ will have to buffer the arriving packet. Also, an arriving packet may be buffered by $IC_0$ if there is already a packet in its buffer 540 which is to be transmitted first.

Figure 16:
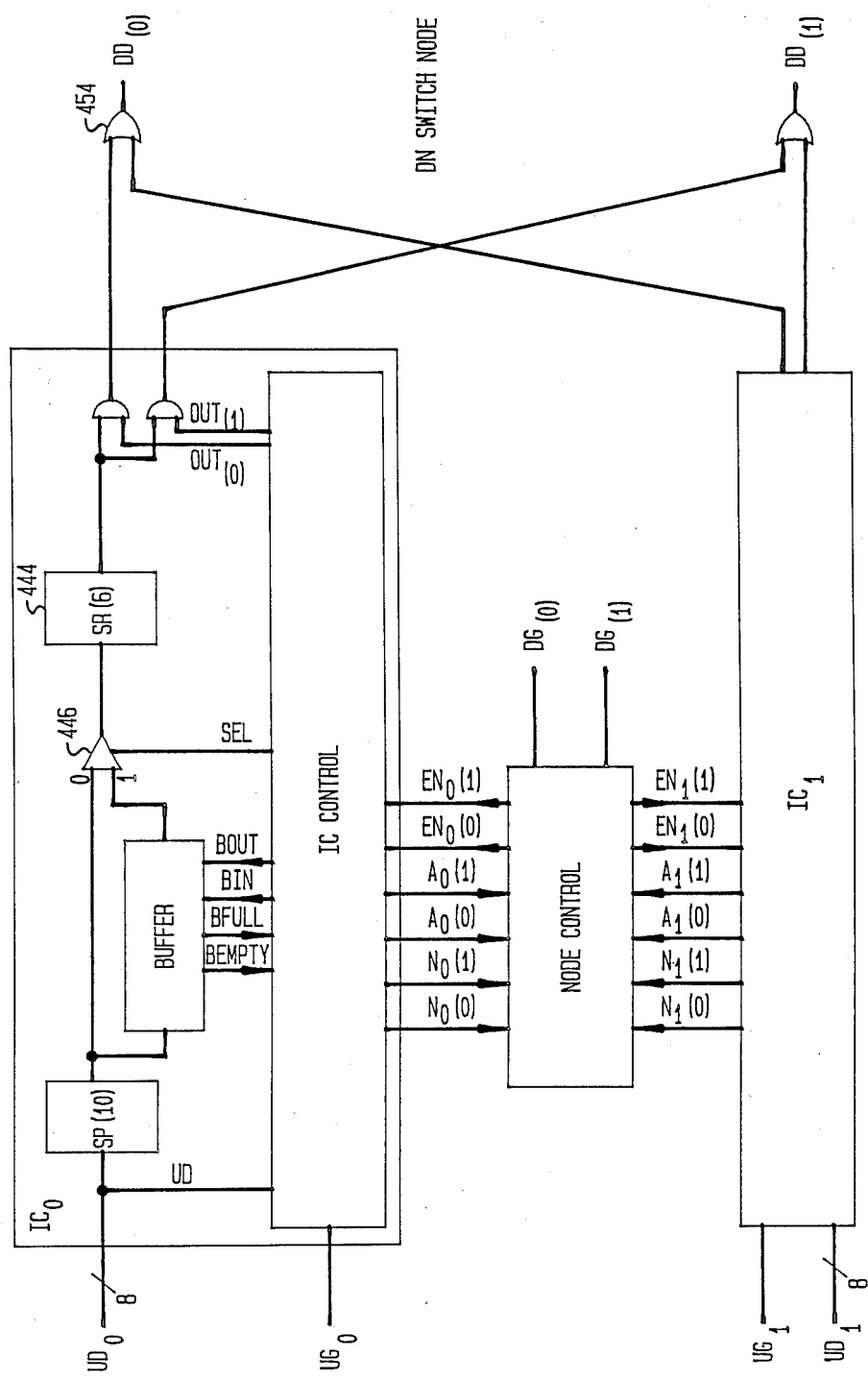

The switch nodes for the DN are similar to those for the RN. (See FIG. 16.) Note that there is no badr signal going from the buffer to the IC control. This is because the DN doesn't use an address bit but uses whatever output port is available (i.e. routing decision is essentially random).

If $IC_0$ in a DN node has a packet (either in its buffer or a newly arriving packet), it sets $n_0$ to 1 (requesting a single output port) and asserts both $a_0(0)$ and $a_0(1)$ (indicating that either output port is acceptable). The Node Control uses the same algorithm described previously for the RN. Assuming there is a port available, the Node Control will assert one of $en_0(0)$ or $en_0(1)$.

To illustrate the operation of the DN node assume a packet is arriving at $IC_0$. The IC control detects the presence of the packet by examining the value of the ud leads at the appropriate time in the packet cycle. Once the packet is detected, the IC control sets $n_0$ to 1 requesting one output port from the Node Control and asserts both $a_0(0)$ and $a_0(1)$ indicating that either output port is acceptable. Based on the values of dg(0) and dg(1) and possible competing requests from $IC_1$, the Node Control determines if it can make an output port available to $IC_0$, according to the Node Control algorithm described above. Assuming that output port 0 is available, the Node Control then asserts $en_0(0)$. In response to this, the IC control sets sel to 0 which allows the incoming packet to bypass the buffer and flow through data selector 446 and shift register 444. The IC control also asserts lead out(1) allowing the packet to flow through to Or gate 454.

Figure 17:
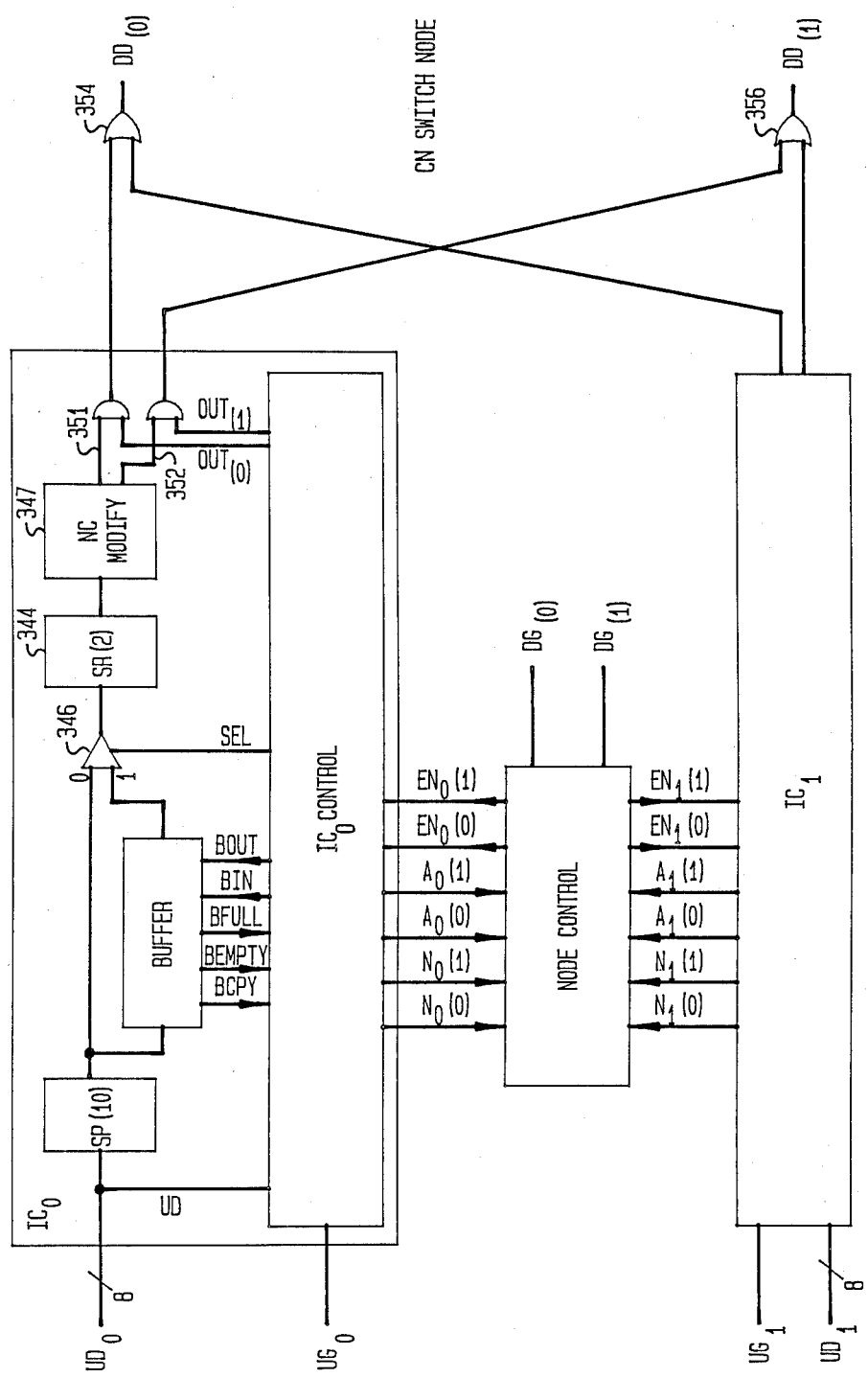

The switch node for the copy network is shown in FIG. 17. In place of the badr signal from the buffer to the IC control circuit, it has a lead called bcpy which is asserted if the buffer's first packet is one that needs to be transmitted to both output ports, i.e. replication is required. Also note that the copy network node contains an NC copy circuit to modify the Number of Copies field (NC) of the packet as it passes out of the node. This circuit modifies the NC field according to the routing algorithm for the copy network described in section 9 above.

If $IC_0$ in a CN node has a broadcast packet that must be replicated, it sets $n_0$ to 2 (requesting both output ports) and asserts both $a_0(0)$ and $a_0(1)$. The Node Control uses the same algorithm described previously for the RN. If both ports are available, the Node Control will assert both $en_0(0)$ and $en_0(1)$.

If $IC_0$ has a point-to-point packet or a broadcast packet which doesn't require replication at this point, it routes the packet to one of the two output ports in the same way as the DN nodes do.

To illustrate the operation of the CN node, assume that a broadcast packet is arriving at $IC_0$ of a node in the penultimate stage of the CN and assume that the NC field is 3 and the BCN field is 9. The $IC_0$ control circuit detects the presence of the packet by examining the value of the ud leads at the start of the packet cycle. It then uses these leads again to extract the NC field from the packet. Based on the value of the NC field, the $IC_0$ control determines that the packet must be copied to both of the output ports, using the Copy network routing control algorithm described in Section 9 above. The $IC_0$ control circuit then sets $n_0$ to 2 requesting 2 output ports from the Node Control and asserts both $a_0(0)$ and $a_0(1)$ indicating that both output ports are acceptable. Based on the values of dg(0) and dg(1) and possible competing requests from $IC_1$, the Node Control determines if both output ports can be made available to $IC_0$, according to the Node Control algorithm described above. Assuming that both output ports are available, the Node Control then asserts $en_0(0)$ and $en_0(1)$. In response to this, the $IC_0$ control circuit sets the sel lead to 0 which allows the incoming packet to bypass the buffer and flow through data selector 346 and shift register 344 to NC Modify circuit 347. NC Modify circuit 347 examines the RC, NC and BCN fields of the packet and based on their values produces two copies of the packet having possibly different NC values as determined by the Copy Network control algorithm described in section 9 above, and sends these two copies to the two output ports. In the example, the copy emerging on leads 351 will have 1 in its NC field while the copy emerging on leads 352 will have 2 in is NC field. The $IC_0$ control circuit asserts leads $out_0$ and $out_1$ allowing the copy on leads 351 to flow through to Or gate 354 and allowing the copy on leads 352 to flow through to Or gate 356. If both output ports are not available (i.e. if $en_0(0)$ and $en_0(1)$ are not asserted), the packet arriving at $IC_0$ will be buffered (i.e. the bin lead will be asserted). This situation could arise if one of the downstream nodes is unable to accept a packet or because a point-to-point or broadcast packet arrives or is buffered at $IC_1$, and the node control circuit allocates one or both of the outputs to the $IC_1$ packet. An arriving broadcast packet at $IC_0$ may also be placed in the buffer, if an earlier arriving broadcast or point-to-point packet is in its buffer awaiting transmission out of one or both output ports.

14. Interconnection of Switch Modules

The switch module 200 of FIG. 2 is designed as a component that can be used to build larger systems such as packet switches and network interfaces. There are several strong arguments in favor of the modular approach:

(1) a system constructed out of small modules is easier to design and implement;
(2) modular systems can grow over a range of sizes by adding modules.
(3) manufacturing economics favor systems that contain a large number of identical components.

The easy growability of modular systems is an important advantage, but can only be realized if the system structure provides some flexible "glue" that can be used to connect the switch modules together.

Figure 18:
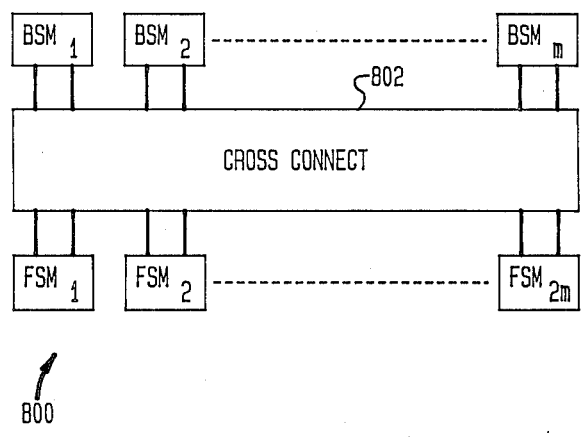
FIG. 18 schematically illustrates a packet switch which may be formed by interconnecting a plurality of switch modules in accordance with an illustrative embodiment of the present invention.

FIG. 18 schematically illustrates a packet switch 800 formed from switch modules. Illustratively, the packet switch 800 comprises 3m switch modules where m is a positive integer. A first set of 2m switch modules are front-end switch modules. These are identified as $FSM_1, FSM_2 \ldots FSM_{2m}$ in FIG. 13. A second set of switch modules are known as back-end switch modules. These are identified as $BSM_1, BSM_2 \ldots BSM_m$ in FIG. 18. The front end switch modules and the back end switch modules are connected by the cross connect structure 802. Illustratively, each FSM has Q fiber optic links connecting it to each of the BSMs, where Q is a positive integer such as one. The remainder of the fiber optic links in each FSM connect to other packet switches and network interfaces. Each BSM has Q fiber optic links connecting it to each FSM. The BSM's serve only to transmit packets from one FSM to another.

The structure of the cross connect 802 is shown schematically in FIG. 19. The cross connect 802 is designed to permit the number of interconnected switch modules to be changed with a minimum of recabling. When a packet switch is first installed, it may be configured with a small number of switch modules (e.g. 3). When more capacity is needed, new switch modules are connected to the cross connect. The cross connect is then reconfigured so as to interconnect the new and old switch modules.

The cross connect 802 is a planar structure comprising a two-dimensional array of switches. Each of the circles 804 represents a switching element in the plane of the cross connect 802. Each switch 804 provides two data paths, one passing through the plane of the cross connect 802 and the other passing diagonally along its surface.

The connections to the BSMs are made on one side of this planar structure while the connections to the FSMs are made on the other side. In addition, all connections from a particular FSM are made along one column of the array of switching elements, while all connections from a particular BSM are made along one row.

Figure 20:
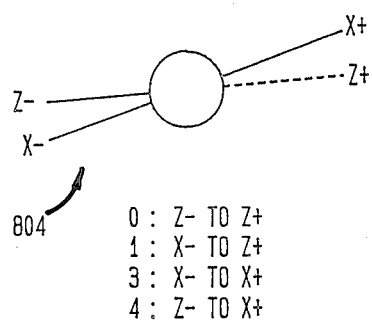
FIGS. 20 and 21 illustrate the individual switches comprising the interconnect circuitry of FIG. 19.

A single switch 804 is illustrated in FIG. 20. The lead $z-$ is perpendicular to the plane of the cross connect and extend outward from one side thereof. The lead $z+$ is also perpendicular to the plane of the cross connect and extends outward from the other side thereof, while the leads that lie in the plane of the cross connect 802 are labeled $x-$ and $x+$. The four possible configurations of the switch 804 of FIG. 20 are $z-$ to $z+$ (straight through the plane) $x-$ to $z+$, $x-$ to $x+$ (along the surface of the plane at a 45 degree angle to the rows of switches) and $z-$ to $x+$.

Figure 21:
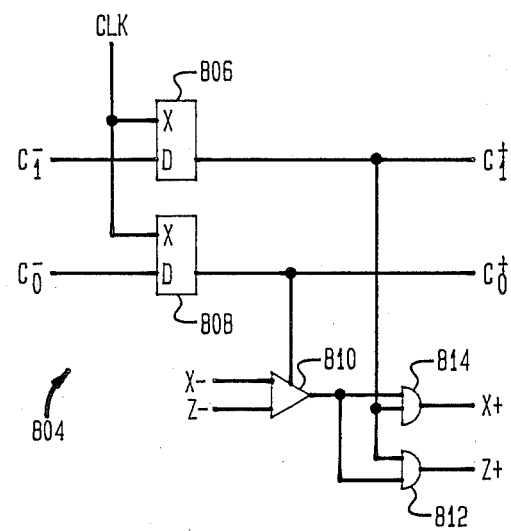

FIG. 21 shows a circuit for implementing the switch 804 of FIGS. 19 and 20. The flip flops 806, 808 provide control signals to the data selector 810 and gates 812, 814 to determine which of the four possible connections between the leads $x+, x-, z+, z-$ is made. All of the flip-flops in the same row of switches are linked together as one long shift register with the individual flip-flops forming the bits of the shift register. To change the configuration of the cross connect 802, new data values are inputted to the shift registers.

Figure 22A:
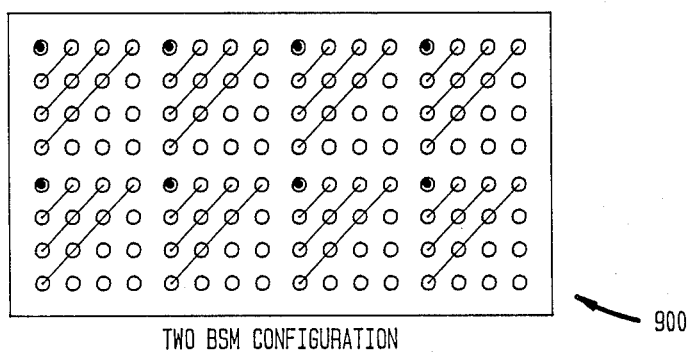
FIGS. 22 (a) and 22 (b) illustrate arrangements of switch modules which may be achieved using the switch modules of FIGS. 2, 6 and 13 and interconnect circuitry of FIGS. 19, 20 and 21.
Figure 22B:
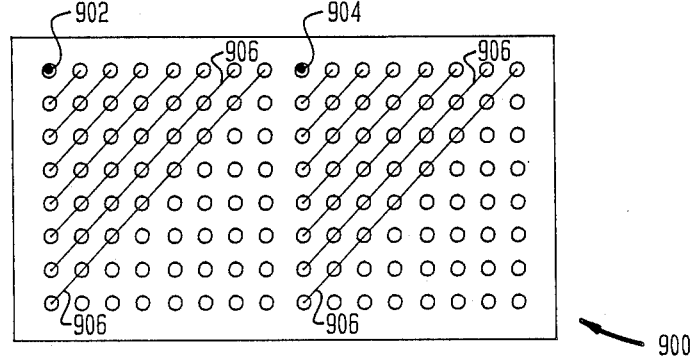

FIG. 22 provides some examples of the type of connections which can be achieved using the cross-connect discussed above. The cross connect 900 of FIGS. 22(a) and 22(b) has 8 rows and 16 columns of switches. Front end switch modules (FSMs) are connected to one side of the cross-connect 900, while BSMs (back-end switch modules) are connected to the other side of the cross-connect 900. As indicated above, all connections from a particular FSM are made to switches in a single column, while all connections from a particular BSM are made to switches in a single row.

FIG. 21(b) shows a situation in which a single BSM is connected with two FSM's. The BSM is connected to on side of the cross-connect plane, the FSM being connected to the other side. Eight fiber-optic links from the first FSM terminate at the switches located in the first column of the cross connect 900. Eight fiber optic links of the second FSM terminate at the switches located in the ninth column of the cross-connect. Sixteen fiber optic links from the BSM terminate at switches located in the first row of the cross-connect. The switches that make up the cross-connect are arranged so that signals from the FSM's are switched up and to the right along paths 906 as shown in FIG. 9(a) so that they leave through switches on the top row of the cross-connect 900 which switches terminate fiber optic links of the single BSM. The signals fed into switches 902, 904, pass right through the plane of the cross connect. There are thus eight paths 906 connecting each of two FSMs to the BSM.

FIG. 21(b) shows a configuration in which four FSM's are connected to on one side of the cross-connect plane and two BSM's are connected to the other side of the cross-connect plane. Eight fiber optic links from each of the four FSM's terminate at the switches comprising columns 1, 5, 9, and 13, respectively. Eight fiber optic links from each of the two BSM's terminate on the switches comprising rows 1 and 4 respectively. The switches comprising the cross connect 900 are programmed so that there are four paths connecting each FSM to each BSM. Thus, increasing the size of a packet switch from three switch modules to six switch modules may be accomplished merely by reprogramming the switches in the cross connect.

A further advantage of the cross connect described herein is its compact size. The cross connect 900 of FIG. 22 is an $8 \times 16$ array which may be viewed as having 128 inputs on one side of the planar array and 128 outputs on the other side of the planar array. If the number of inputs and outputs is to be increased to 256, a $16 \times 16$ array is needed, which essentially doubles the size of the cross connect. In other words, the cross connect described herein grows linearly in size as the number of inputs and outputs increases. This follows directly from the fact that the cross connect utilizes both sides of a planar array to interconnect sets of switch modules.

In contrast conventional cross connect structures increase quadratically in size as the number of inputs and outputs increases.

Finally, the above described embodiments of the invention are intended to be illustrative only. Numerous

I claim:

1. A packet switch comprising
   copy network means for receiving information packets at individual inputs thereof and replicating identical copies at multiple outlets thereof,
   routing and distribution network means for receiving packets from said copy network means and transmitting them to predetermined destinations, and
   control means responsive to information contained in the packets for determining the number of copies to be replicated by said copy means and said destinations.

2. A packet switch in accordance with claim 1 wherein said routing and distribution network means includes a routing network for routing packets to said destinations and a distinct distribution network for evenly distributing packets from said copy network means to said distribution network.

3. A packet switch in accordance with claim 2 wherein said control means includes translator means between said copy network means and said distribution network for providing each of said packet copies leaving said copy network with a destination address.

4. A packet switch in accordance with claim 2 wherein said control means includes first and second translation means between said copy network means and said distribution network,
   said first translator means providing at least some of said packet copies leaving said copy network with an identification number for a group of destinations, and
   said second translator means providing to those packets with an identification number provided by said first translator means the address of one of said destinations in the group identified by said number in a manner so that all destinations in a group receive approximately the same volume of packet traffic.

5. A switch module for use in a packet switching network having broadcast capability comprising:
   a copy network having a plurality of inputs and a plurality of outputs, said copy network being capable of receiving data packets at said inputs and replicating said packets to produce copies of said packets at said outputs,
   memory means in communication with the outputs of said copy network for providing destination address information for each of the packet copies produced by said copy network, and
   a routing network capable of routing each of the packet copies to a desired destination having an address supplied by said memory means.

6. A switch module for use in a packet switching network, said switch module terminating a plurality of bidirectional data links and being capable of routing point-topoint packets from one of said data links to another of said data links and being capable of copying broadcast packets and routing broadcast packets to a plurality of said links, said switch module comprising
   a copy network comprising a plurality of nodes arranged in stages and having a plurality of inputs and a plurality of outputs, said copy network being capable of passing unchanged each point-to-point packet from one of said inputs to one of said outputs, and replicating each broadcast packet to produce copies at at least some of said outputs,
   memory means coupled to said copy network outputs for supplying an address of an outgoing data link to each copy of a broadcast packet leaving said copy network, and
   a routing network for routing said point-to-point packets and said broadcast packets to outgoing data links.

7. A switch module for use in a packet switching network, said switch module terminating a plurality of bidirectional data links and being capable of routing point-topoint packets from one of said data links to another of said data links and being capable of copying packets and routing broadcast packets to a plurality of said links, said switch module comprising
   a copy network for passing each point-to-point packet unchanged and for making a desired number of copies of each broadcast packet,
   memory means for supplying an address of an outgoing data link to each copy of a broadcast packet leaving said copy network, and
   a routing network for routing said point-to-point packets and said broadcast packets to outgoing data links,
   said switch module further comprising a distribution network for preventing congestion in said routing network interposed between said copy network and said routing network.

8. A switch module for use in a packet switching network, said switch module terminating a plurality of bidirectional data links and being capable of routing point-to-point packets from one of said data links to another of said data links and being capable of copying broadcast packets and routing broadcast packets to a plurality of said links, said switch module comprising
   a copy network for passing each point-to-point packet unchanged and for making a desired number of copies of each broadcast packet,
   memory means for supplying an address of an outgoing data link to each copy of a broadcast packet leaving said copy network, and
   a routing network for routing said point-to-point packets and said broadcast packets to outgoing data links,
   wherein some of said point-to-point packets include a number identifying a group of outgoing data links and wherein said switch module includes further memory means for translating said group identification number into the address of one of said links in said group in a manner so that all links in said group receive approximately the same volume of packet traffic.

9. A switch module for use in a packet switching network, said switch module terminating a plurality of bidirectional data links and being capable of routing point-to-point packets from one of said data links to another of said data links and being capable of copying broadcast packets and routing broadcast packets to a plurality of said links, said switch module comprising
   a copy network for passing each point-to-point packet unchanged and for making a desired number of copies of each broadcast packet,
   memory means for supplying an address of an outgoing data link to each copy of a broadcast packet leaving said copy network, and a routing network for routing said point-to-point packets and said broadcast packets to outgoing data links, wherein said copy network has a plurality of inputs and said routing network has a plurality of outputs and wherein said switch module further comprises a plurality of processors, each of said processors interfacing one of said bidirectional links with one input of said copy network and one output of said routing network, each of said processors comprising translation memory for supplying routing information to packets for routing said packets through said switch module.

10. The switch module of claim 9 wherein each packet arriving at a given one of said processors by way of an associated data link includes a logical channel number for indexing the translation memory means in said given processor, said translation memory means serving to cause routing information to be written into each packet indicating whether each packet is a point-to-point packet or a broadcast packet.

11. The switch module of claim 10 wherein said packet is a point-to-point packet and said information includes the address of the data link over which said packet leaves said switch module.

12. The switch module of claim 10 wherein said packet is a broadcast packet and said information includes the number of copies to be made by the copy network and a broadcast channel number for determining a destination address for each packet copy made by said copy network.

13. A packet switch module comprising copy network means for receiving broadcast packets at individual inputs thereof and replicating identical copies at multiple outputs thereof, first memory means associated with each output of said copy network for providing each of said copies leaving said copy network with routing information to enable each of said copies to be routed to a destination;

second memory means associated with each of said first memory means for controlling the writing of said routing information into each of said first memory means, each of said second memory means capable of being indexed by a broadcast destination update packet containing a plurality of routing information entries to retrieve information which identifies which of said routing information entries in said broadcast destination update packet is to be written into the associated first memory.

14. The packet switch module of claim 13 wherein a particular copy bound for a particular destination may exit the copy network at any of a group of said outputs of said copy network, and wherein said first memory means associated with each of said outputs in said group is capable of providing said particular packet with the address of said particular destination, whereby said particular packet is routed to said particular destination regardless of which output in said group said particular packet uses.

15. A method for copying a data packet and distributing the copies of the data packet to a plurality of destinations comprising the steps of receiving said packet at an input of a copy network and replicating said packet in said copy network so that a plurality of copies of said packet emerge at a plurality of outputs of said copy network, providing each of said packet copies emerging at the outputs of said copy network with a destination address by indexing a memory, and routing each of said packet copies through a routing network to its destination.

16. The method of claim 15 wherein said providing step comprises the steps of indexing a memory utilizing an identification number contained in said packet and writing into said packet the address of a destination data link.

17. The method of claim 15 wherein said providing step comprises the steps of indexing a first memory and writing into each packet copy an identification number for a group of data links and indexing a second memory with said indentification number and writing into said packet the address of one of said data links in said group, the address of said one data link being chosen so that all of the data links in said group receive approximately the same volume of packet traffic.

18. A process of controlling the passage of data packets through a binary network comprising a plurality of switching elements arranged in stages, each said element having a pair of inputs and a pair of outputs and wherein each packet has an NC field to indicate the number of remaining copies to be made of the packet during the passage of the packet through the network comprising the steps of:

(a) ascertaining for each entering packet the number of copies of the incoming packet which are to be made for broadcast to a plurality of destinations, (b) controlling the element of the stage receiving said packet to deliver said packet to each output of said pair when the number of remaining copies to be made exceeds $2^{sn-1}$ where sn identifies the position of the said last-mentioned stage relative to the position of the output stage in said network, and (c) when the broadcast channel number of the packet is even, changing the number recorded in said NC field in said packet at the uppermost one of said pair of outputs to the integer part of $(NC+1)/2$ and changing the number recorded in said NC field in said packet at the lowermost one of said pair of outputs to the integer part of $NC/2$, and (d) when the broadcast packet number is odd, changing the NC field of said upper packet to the integer part of $NC/2$ and the integer part of said lower packet to the integer part of $(NC+1)/2$.

19. The process of claim 18 comprising a further step of randomly routing each packet to one of said output ports when the number of remaining copies to be made is less than $2^{sn-1}$.

* * * * *